United States Patent [19]

Saitou

[11] Patent Number: 4,661,826

[45] Date of Patent: Apr. 28, 1987

[54] PICTURE IMAGE FORMING APPARATUS

[75] Inventor: Masao Saitou, Kamakura, Japan

[73] Assignee: Kabushiki Kaisha Toshiba, Japan

[21] Appl. No.: 737,056

[22] Filed: May 23, 1985

[30] Foreign Application Priority Data

| | | | |
|---|---|---|---|
| May 23, 1984 | [JP] | Japan | 59-104977 |
| May 28, 1984 | [JP] | Japan | 59-107771 |
| Jul. 17, 1984 | [JP] | Japan | 59-148373 |

[51] Int. Cl.⁴ .......... G01D 15/10

[52] U.S. Cl. .......... 346/76 PH; 346/105; 400/120; 400/234

[58] Field of Search .......... 346/76 PH, 76 R, 105, 346/106; 400/120, 225, 234; 242/75.44, 200, 203, 204, 75.5–75.52

[56] References Cited

U.S. PATENT DOCUMENTS

| | | | |
|---|---|---|---|
| 4,000,804 | 1/1977 | Zaltieri | 400/234 |
| 4,532,525 | 7/1985 | Takahashi | 400/120 |

*Primary Examiner*—Arthur G. Evans

*Attorney, Agent, or Firm*—Finnegan, Henderson, Farabow, Garrett & Dunner

[57] ABSTRACT

In picture image forming apparatus employing a copying paper and a transfer printing ribbon with both ends connected to take up cores, when the leading end of the copying paper is located close to a transfer printing unit, the tension of the ink ribbon is increased for preventing clogging of the paper and misalignment of printed picture images. Further, the tensions applied to the both ends of the ribbon are controlled to apply a braking force to the ribbon and then stop the same for the purpose of preventing over running of the ribbon.

20 Claims, 29 Drawing Figures

PICTURE IMAGE FORMING APPARATUS

BACKGROUND OF THE INVENTION

1. Field of the Invention

This invention relates to picture image forming apparatus utilized for a heat transfer printing type copying machine or the like.

2. Description of the Prior Art

Recently, a heat transfer printing type color copying machine has been developed in which color copying is made by using heat transfer ink ribbons of a plurality of colors on an ink donor sheet. Briefly stated, according to this type of the copying machine, a manuscript is scanned with optical scanning means for reading the picture image data of the manuscript as light color signals, the read out picture image data are converted into color data corresponding to respective types of the transfer printing ink ribbons, and the color data of respective inks are temporarily stored in memory means. The color data thus stored are sequentially read out, inking units corresponding to the heat transfer printing ink ribbons are used in accordance with read out color data and the inks are heat transfer printed with a heat sensitive head, thus effecting color copying by sequentially transfer printing, one color after another, onto a sheet of paper hereinafter called copying paper.

In the copying machine of this type, during the transfer printing the copying paper is conveyed while being clamped between a platen and the ink ribbon. After transfer printing, the copying paper is conveyed between a push roller and the platen. However, since the ink ribbon is moved under a constant tension, when the tension is adjusted to be suitable for thin paper, if thick or stiff paper were used, the leading end of the paper would collide against a ribbon guide with the result that the paper clogs the ribbon guide, or the paper is entrapped or misalignment of transfer printed copies would occur. Where the tension is made high at the start of the machine, at the time of transfer printing of a thin paper, adequate tension cannot be obtained causing misalignment of transfer printed picture images.

Both ends of the ink ribbon are wound on a pair of cores independently driven by drive means and the ink ribbon is run between the cores under tension and stopped. On the ink ribbon are coated color agents comprising a combination of yellow, magenta, cyan, and black or a combination of yellow, magenta and cyan. During the transfer printing operation, after completing the transfer printing of a color agent of a given color, the copying paper is run in the opposite direction to an original position and at the same time the ink ribbon is run to a position at which the transfer printing of the next color agent is to be started.

In this case, after detecting, for example, bar codes formed on the ink ribbon, the tensions applied to the ink ribbon in the opposite directions created by both drive means are made equal to stop the ink ribbon. However, due to the inertia of the drive means and the winding cores, the ribbon tends to over run so that it has been difficult to instantaneously stop the paper at a desired position. Consequently, the color agents must be coated over a range wider than a range (a length in the running direction) of the color agent contributing directly to the formation of the picture image whereby the ink ribbon is not used efficiently. Otherwise, it becomes impossible to superpose color agents of a plurality of colors by successive transfer printing operations.

Furthermore, with the prior art heat transfer printing apparatus, the ink ribbon often slacks temporarily during operation which causes degradation of the picture quality, such as blurring of the transfer printed picture images. Especially, in the multicolor heat transfer system since there are such motions as reciprocation of the recording head and forward and reverse runnings of the ink ribbon, the temporal slack of the ribbon greatly decreases the picture quality.

SUMMARY OF THE INVENTION

Accordingly it is an object of this invention to provide an improved picture image forming apparatus capable of positively preventing clogging caused by copying paper as well as misalignment of the picture images.

Another object of this invention is to provide an improved picture image forming apparatus capable of minimizing overrun of the ink donor sheet at the time of stopping the same thus preventing waste of the sheet and ensuring accurate superposed transfer printing operations of a plurality of color agents.

Still another object of this invention is to provide a picture image forming apparatus capable of positively preventing generation of slacks of the ink donor sheet.

Briefly stated, according to this invention these objects can be accomplished by increasing the tension of the ink donor sheet when the leading end of the copying paper is near a transfer printing unit, e.g., the leading end of the paper lies between the transfer printing unit and the guide member for the ink donor sheet.

According to this invention, there is provided picture image forming apparatus wherein an ink donor sheet is interposed between a platen and a recording head to run freely so as to transfer print an ink of the ink donor sheet onto a copying medium by using the recording head, characterized in that the apparatus comprises a first core for taking up one end of the ink donor sheet; a second core for taking up the other end of the ink donor sheet; first drive means for applying a first torque to the first core; second drive means for applying a second torque to the second core; and control means for controlling the first and second drive means such that the first and second torques are applied in the opposite directions, and the difference between the first and second torques will be larger than those of other cases when the leading end of the copying medium is located close to the recording head.

According to a modified embodiment of this invention, there is provided a picture image forming apparatus wherein an ink donor sheet is interposed between a platen and a recording head to run freely, and an ink of the ink donor sheet is transfer printed onto a copying medium by the recording head, characterized in that the apparatus comprises a first core for taking up one end of the ink donor sheet; a second core for taking up the other end of the ink donor sheet; first drive means for applying a first torque to the first core; second drive means for applying a second torque to the second core; and control means which, when the first and second torques are in an opposite directions, the first torque is larger than the second torque and when the ink donor sheet is conveyed from first core to the second core and then to be stopped, controls the first and second drive means such that the second torque is made to be larger than the first torque and then the first torque is made to be equal to the second torque.

According to still further embodiment of this invention there is provided a picture image forming apparatus wherein an ink donor sheet is interposed between a platen and a recording head to run freely so as to transfer print an ink of the ink donor sheet onto a copying medium, characterized in that the apparatus comprises a first core for taking up one end of the ink donor sheet; a second core for taking up the other end of the ink donor sheet; first drive means for applying a first torque to the first core; second drive means for applying a second torque to the second core; and control means for controlling the first and second drive means such that at the time of conveying the ink donor sheet from the first core to the second core, the first and second torques are applied in opposite directions with each other and the first torque will be larger than the second torque, that when the ink donor sheet is conveyed from the second core to the first core, the first and second torques are applied in opposite directions with each other and the second torque will be larger than the first torque, and that when the ink donor sheet is to be stopped, the first and second torques are applied in opposite directions with each other and the first and second torques will be equal.

DESCRIPTION OF THE PREFERRED EMBODIMENT

Figure 1:
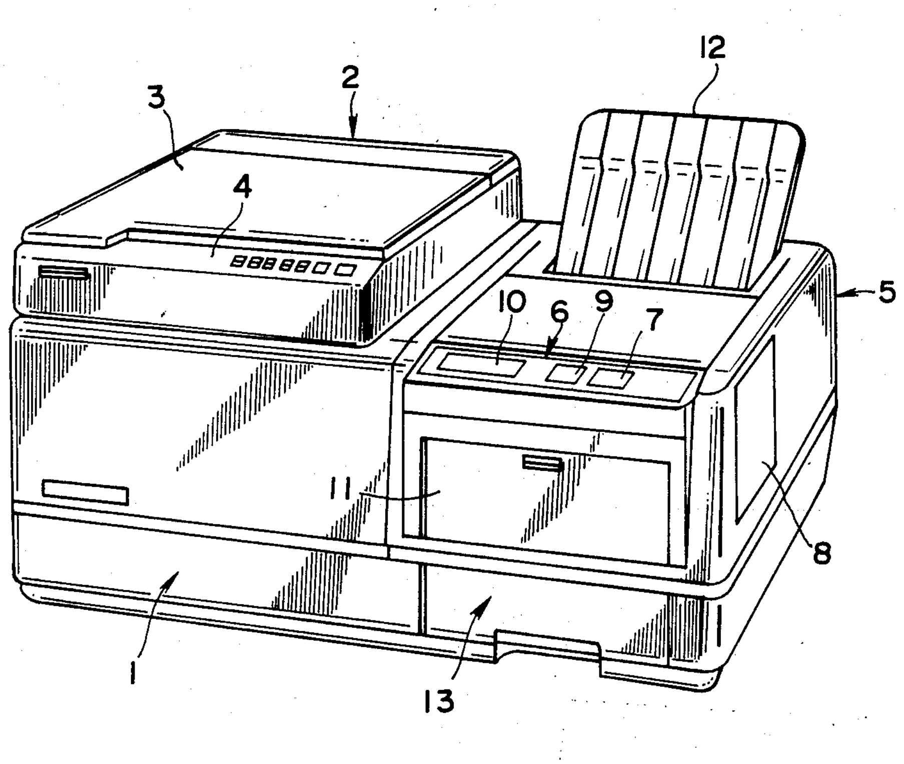
FIG. 1 is a perspective view showing the picture image forming apparatus embodying the invention.

FIG. 1 shows a color copying machine as an example of the picture image forming apparatus according to this invention. The copying machine comprises a base 1 for supporting picture image data read out apparatus 2 provided with a manuscript cover 3 free to be opened and closed and a manuscript supporting plate, not shown, made of transparent glass and located beneath the cover 3. The picture image data read out apparatus 2 is constructed to optically scan a manuscript mounted on the manuscript supporting plate and to photoelectrically convert the resulting optical data by reciprocating a scanning unit (to be described later in detail) made up of a light emitting optical system along the lower surface of the manuscript supporting plate. An operating panel 4 is provided on the upper surface of the read out device 2. The signals converted by the picture image data read out device 2 are supplied to a picture image forming unit 5 removably mounted on the right side of the copying machine. In the picture image forming unit 5 a picture image is formed on a sheet of copying medium (usually copying paper) in accordance with the converted signal. An operating panel 6 is provided for the upper front surface of the picture image forming unit 5. The operating panel 6 is provided with an on-line scanner key 7 which selects the picture image data read out apparatus 2 connected to the copying machine, an ejection key 9 operated when a heat transfer printing ribbon acting as a transfer printing agent is taken out through a door 8 at the side surface, and a displayer 10. A guide member 11 free to open and close is provided for the front surface of the picture image forming unit 5 for manually inserting copying papers, and a paper discharge tray 12 is provided for discharging printed papers. A withdrawable paper feed cassette 13 containing the copying papers is provided for the base 1 beneath the picture image forming unit 5.

Figure 2:
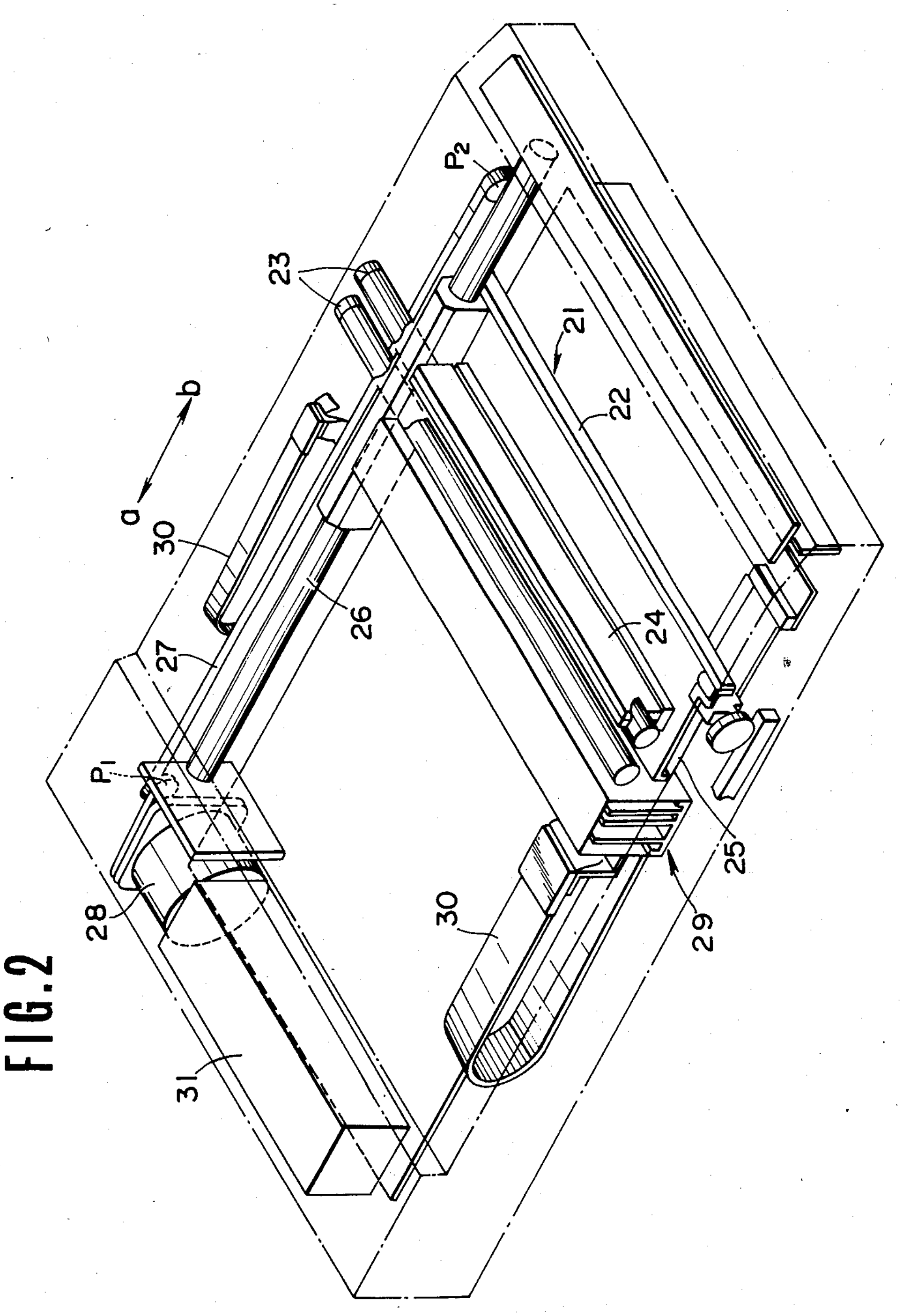
FIG. 2 is a perspective view showing the general construction of picture image data read out apparatus utilized in this invention.

FIG. 2 shows the construction of the picture image data read out apparatus 2. Two lamps 23 are disposed in parallel above a carriage 22 comprising a scanner unit 21, and two inverted V shaped lenses 24 are arranged between the lamps 23. A photoelectric converter 25 constituted by a color CCD is provided beneath the lenses 24. One end of the carriage 22 is slidably fitted on a guide shaft 26 and connected to a so-called timing belt (a belt formed with teeth) extending along the guide shaft 26. The timing belt is driven by a pulse motor 28. More particularly, the timing belt 27 is passed around a pulley $P_1$ driven by the pulse motor 28 and an idle pulley $P_2$ so as to move the scanner unit 21 in the direction of arrows a and b as the timing belt 27 is run. There are also provided an A/D converter 29 for converting the output signals from the photoelectric converter 25 into digital signals, an inverter 31 and a flat cable 30 for supplying the output power of the inverter 31 to the lamps 23 and for supplying the output signals of the A/D converter 29 to the picture image forming unit 5.

Figure 3:
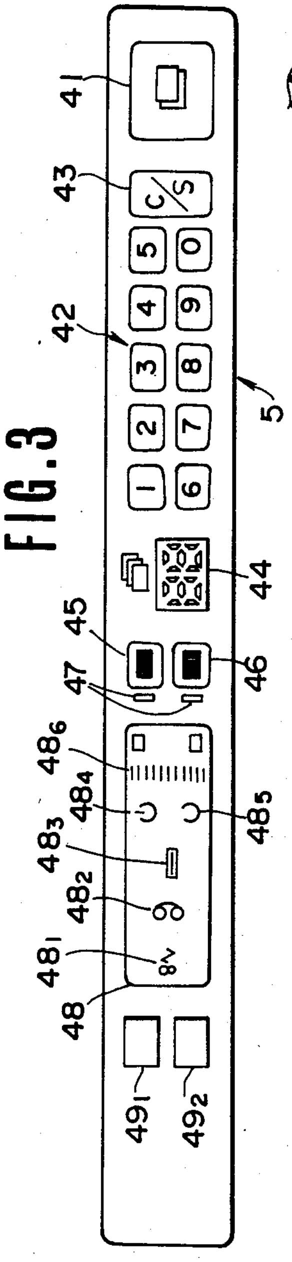
FIG. 3 is a plan view showing the construction of an operating panel.

The operating panel 4 (shown in FIG. 3) of the picture image information read out apparatus 2 comprises a print key 41 designating the start of the printing, a ten key 42 designating the number of copying papers, a clear stop key 43 designating release of the designation of the number of copying papers as well as stopping of the printing, a set number displayer displaying the number of prints, an intermediate tone key 45 designating a half tone mode corresponding to full color and the concenration thereof, two value mode key 46 designating a two value mode corresponding to monocolor or seven colors and the concentration thereof, a mode displayer 47 displaying a set mode key, a displayer 48 performing various displays, and printing mode keys $49_1$ and $49_2$ which affect transfer between two color printing and multicolor superposed printing. The displayer 48 comprises a jam displayer $48_1$ lighted when the machine is clogged or jammed with copying paper, a ribbon displayer $48_2$ displaying such various states as a state in which a ribbon is not set in the ribbon cassette and a state in which the cassette itself is not mounted, a paper displayer displaying the mounted state of a paper feed cassette 8, and presence or absence of the copying paper, scanner displayers $48_4$ and $48_5$ displaying the operating state of the scanner unit 11, and a concentration displayer $48_6$ displaying the concentration set by the operation of the mode keys 45 and 46.

Figure 4:
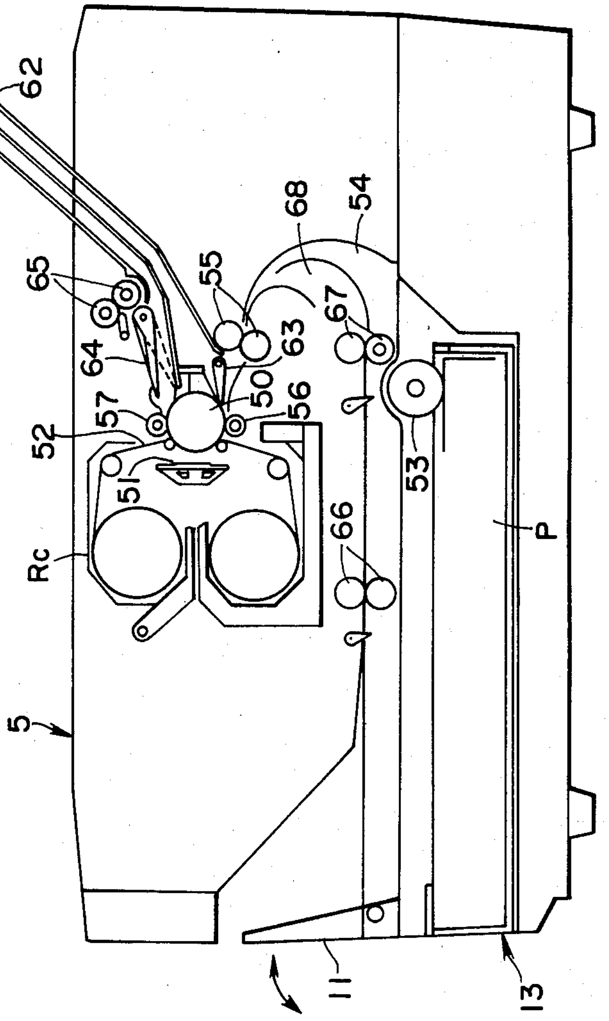
FIG. 4 is a sectional side view showing the construction of a picture image forming unit.

The picture image forming unit 5 has a construction as shown in FIG. 4. Thus a platen 50 is located at substantially the center of the picture element forming unit 5 and a thermal head 51 acting as a recording head (heat sensitive head) is disposed in front of the platen 50 to be moved toward and away therefrom. The thermal head 51 is contained in a ribbon cassette Rc and a heat transfer printing ribbon (ink ribbon) acting as a picture image forming medium is interposed between the thermal head 51 and the platen 50. Under this state, the copying paper P is urged against the platen 50. When a line and dot shaped heat generating element (not shown) of the thermal head 51 generates heat, the ink on the heat transfer printing ribbon 52 is heat fused reading to be transfer printed on the copying paper P.

A feed paper roller 53 is provided at a lower right position of the platen 50 for taking out, one after one, the copying papers P contained in the paper feed cassette. The paper P thus taken out is guided to a regist roller 55 disposed at right upper position of the paper feed roller 53 which aligns the leading ends of the paper. Thereafter the copying paper is conveyed toward the platen 50 and wound therearound by push rollers 56 and 57 to be fed positively.

Figure 5:
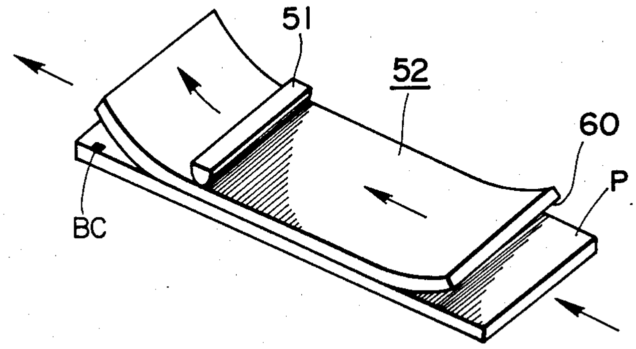
FIG. 5 is a perspective view useful to explain the transfer printing operation.

The thermal head 51 urges the copying paper P against the platen 50 via heat transfer printing ribbon 52 so as to heat fuse the ink 60 on the heat transfer printing ribbon 52 as shown in FIG. 5 to transfer print the ink onto the copying paper P.

Figure 6:
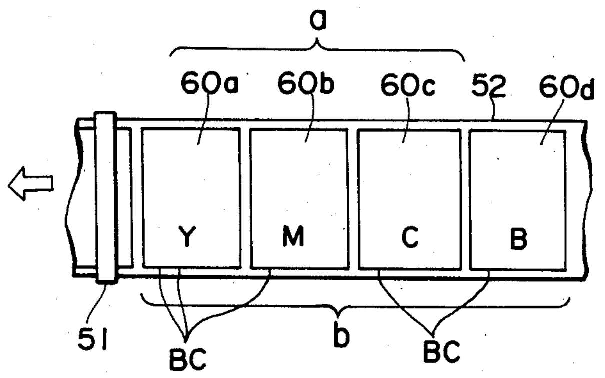
FIG. 6 is a plan view showing the state of coating inks on an ink donor sheet.

As shown in a range a in FIG. 6, the heat transfer printing ribbon 52 is formed with juxtaposed ink sections 60*a*, 60*b*, 60*c* of yellow (Y) magenta (M) and cyan (C) each having substantially the same wedge as the copying paper P, or as shown in a range formed with juxtaposed ink sections 60*a*, 60*b*, 60*c* and 60*d* of yellow (Y), magenta (M), cyan (C) and black (B). Colors are sequentially transfer printed, and the paper is returned to the original position, thus sequentially superposing printed colors.

On the side edges of the heat transfer printing ribbon 52 corresponding to respective ink sections 60*a*–60*d* are provided bar codes BC which are necessary for judging the ink sections 60*a*–60*d* and to align the leading ends of the papers and of respective ink sections. These bar codes BC are read by a bar code sensor shown by 78 in FIG. 8. Where it is desired to clearly print black color, the black ink section 60*d* is added to the heat transfer printing ribbon. Even in a ribbon not provided with the black section 60*d*, black color can be printed by superposing the other three colors.

As above described, the copying paper P is reciprocated by a number equal to the number of colors. At this time, the paper P is guided on first and second guides 61 and 62 extending along the lower side of the paper discharge tray 12.

Figure 7A:
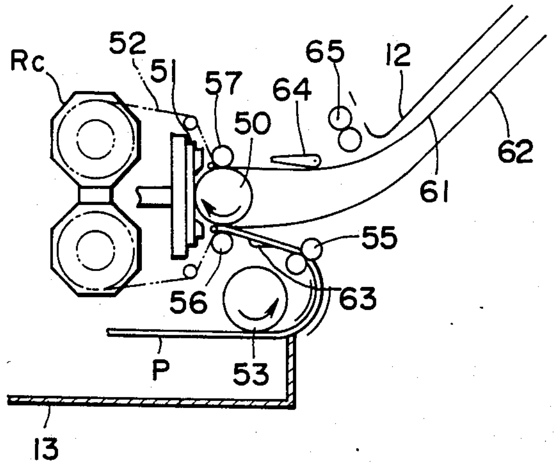
FIGS. 7A–7D are side views for explaining the movement of paper at the time of multicolor transfer printing.

This movement will be described with reference to FIGS. 7A through 7D. At first, the copying paper P supplied from the paper feed cassette 13 is wrapped about the platen 50 through resist roller 55 and a first transfer gate 63, as shown in FIG. 7A.

Figure 7B:
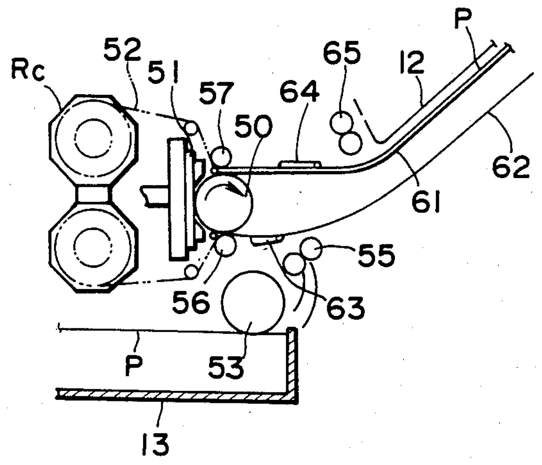

Then the platen 50 is driven by the pulse motor, not shown, to convey the paper P at a predetermined speed, and at the same time the heat generating element, not shown, of the platen 50, which is formed in a dot and line form in the axial direction of the platen 50 is caused to generate heat in accordance with the picture data, thus transfer printing inks 60 of the heat transfer printing ribbon 52 onto the copying paper P. The leading end of the copying paper P which has passed through the platen 50 is sent to the first guide 61 extending along the lower surface of the paper discharge tray 12 by the second transfer gate 64, as shown in FIG. 7B.

Figure 7C:
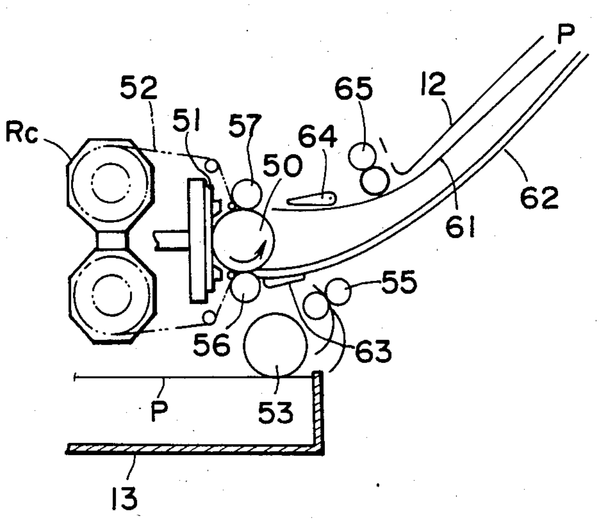

As the platen 50 is rotated in the opposite direction, the copying paper P transfer printed with the ink 60 of one color is moved in the opposite direction, and due to the rotational displacement motion of the first transfer gate 63, the paper is now sent onto the second guide 62 extending along the lower surface of the first guide 61, as shown in FIG. 7C.

In this manner, by reciprocating the copying paper P several times a plurality of colors can be transfer printed in a superposed manner.

Figure 7D:
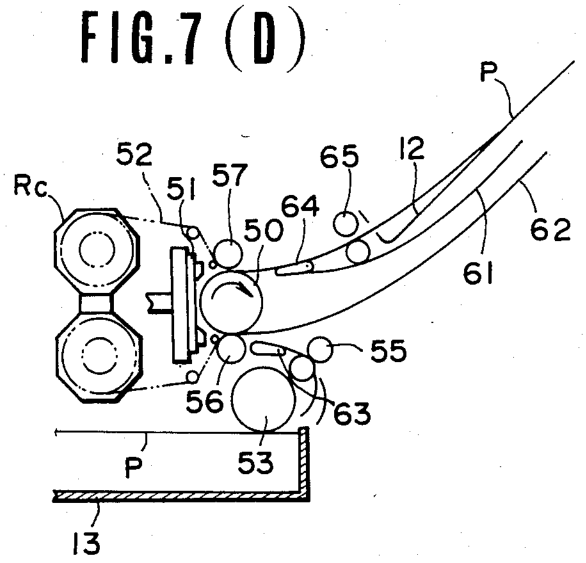

Finally, the copying paper P which has been transfer printed with inks of all colors is guided to a pair of paper discharge rollers 65 by the second transfer gate 64 and discharged on the paper discharge tray 12, as shown in FIG. 7D.

In FIG. 4, a pair of rollers 66 and 67 are provided to convey copying papers manually inserted, and the paper conveyed by these rollers 66 and 67 is guided to the resist roller 55 via a guide way 68.

Figure 8:
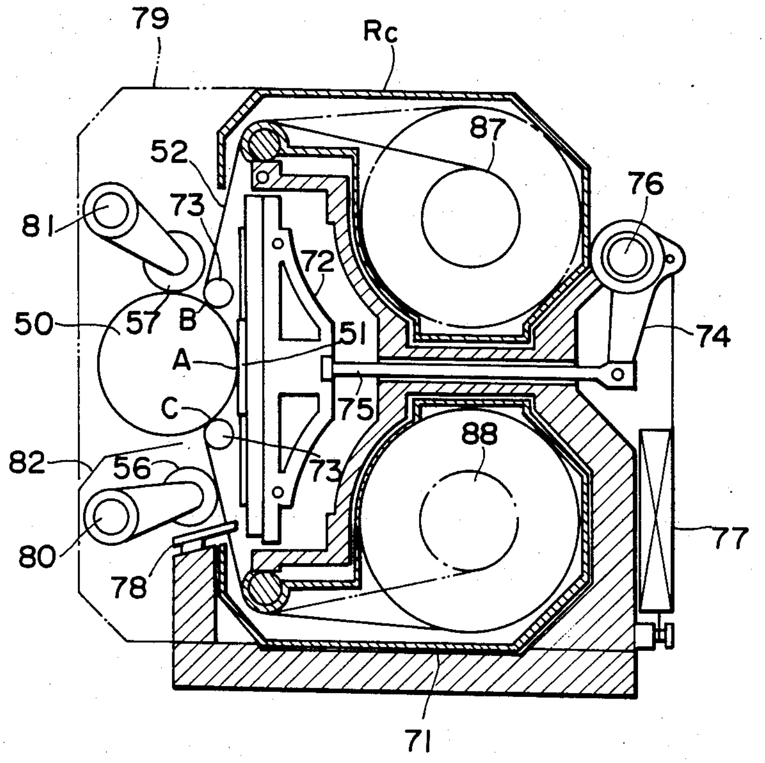
FIG. 8 is a sectional view of the picture image forming unit.
Figure 9:
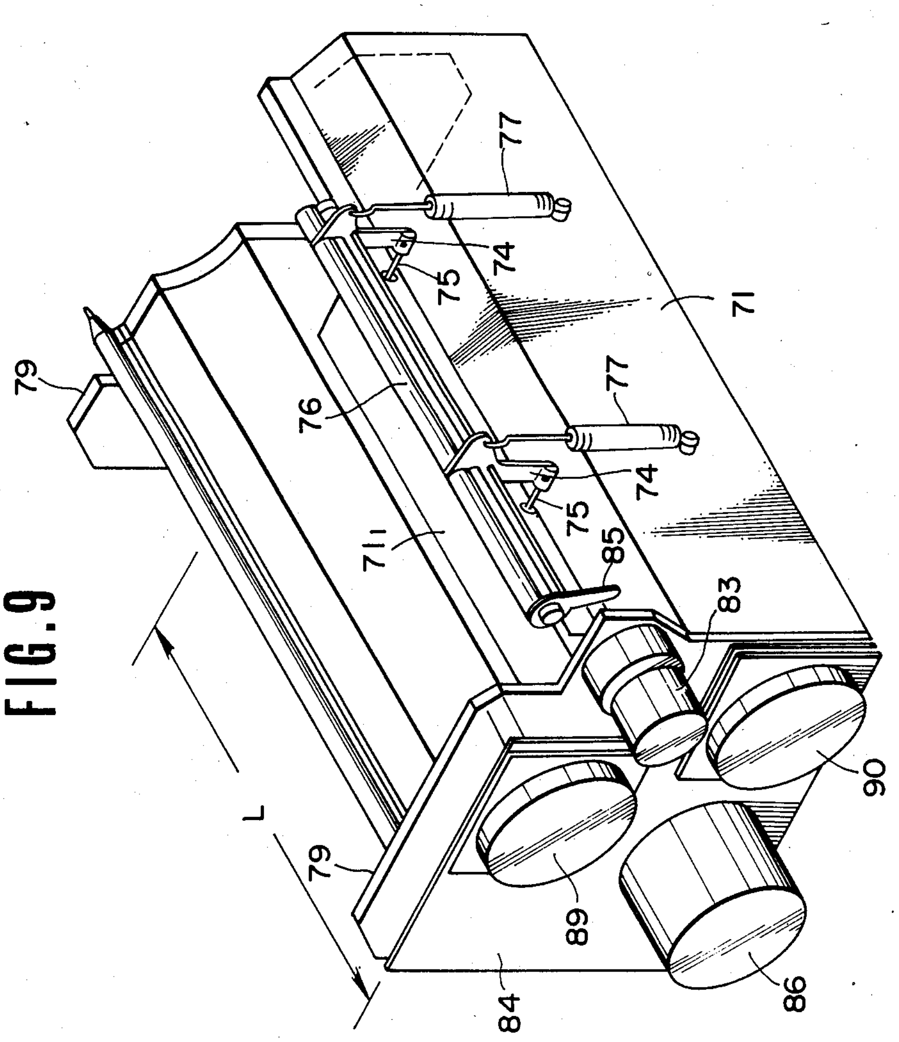
FIG. 9 is a perspective view of the picture image forming unit.
Figure 10:
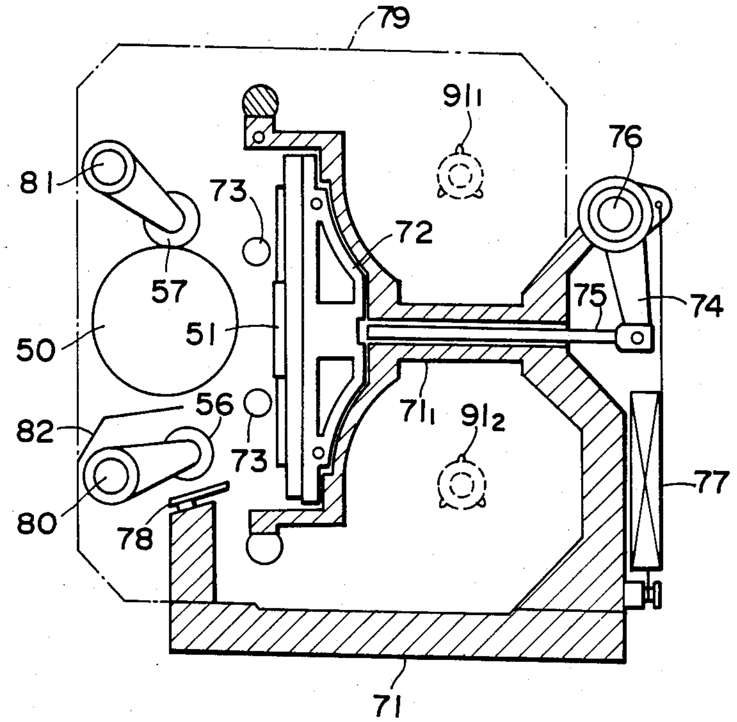
FIG. 10 is a sectional view of the picture image forming unit with a ribbon cassette removed.

The detailed construction of the picture image forming unit 5 will be described hereunder. As shown in FIGS. 8, 9 and 10, a printer block 71 has generally the same configuration as the contour of the ribbon cassette Rc. The block 71 is provided with a head holder 72 supporting the rear surface of the thermal head 51 and acting as a heat dissipating plate, a guide member 73 integrally connected to the head holder 72, a rod 75 with one end connected to the head holder 72 and the other end connected to a drive link 74, a rotating shaft 76 of link 74, a coil spring 77 urging the link 74 to rotate in one direction and moving the thermal head 51 towards the platen 50 via rod 75, and a bar code sensor 78 for detecting the bar code attached to the heat transfer printing ribbon 52, the bar code sensor comprising a luminous element and a light receiving element. The drive link 74, rod 75, shaft 76 and coil springs constitute a head moving or shifting mechanism.

The platen 50 is supported by opposing frames 79 on both sides of the printer block 71. Between the frames 79 are provided shafts 80 and 81 for supporting pressure rollers 56 and 57 that urge the copying paper P against the platen 50. These pressure rollers are driven by solenoid coils, not shown. A paper guide 82 is provided between the pressure roller 56 and the platen 50. As shown in FIG. 9, a motor 83 for driving the thermal head 51 and a motor frame 84 is provided for one of the frames 79. A cam, not shown, is mounted on the shaft of motor 83 for rotating a lever 85 provided for the rotating shaft 76 so as to drive the thermal head 51 against the force of coil springs 77. The motor frame 84 is provided with ribbon drive motors 89 and 90 for driving cores 87 and 88 (see FIG. 8) for taking up the heat transfer printing ribbons contained in the ribbon cassette Rc, and a platen drive motor 86. These motors 86, 89 and 90 drive the platen 50, cores 87 and 88 respectively through gears, not shown. As shown in FIG. 10, projections $91_1$ and $91_2$ are provided at the center of the rotation of the gears driving the cores 87 and 88. The motors 89 and 90 are controlled to produce variable torques to run the heat transfer printing ribbon 52 in the forward and reverse directions.

Figure 11:
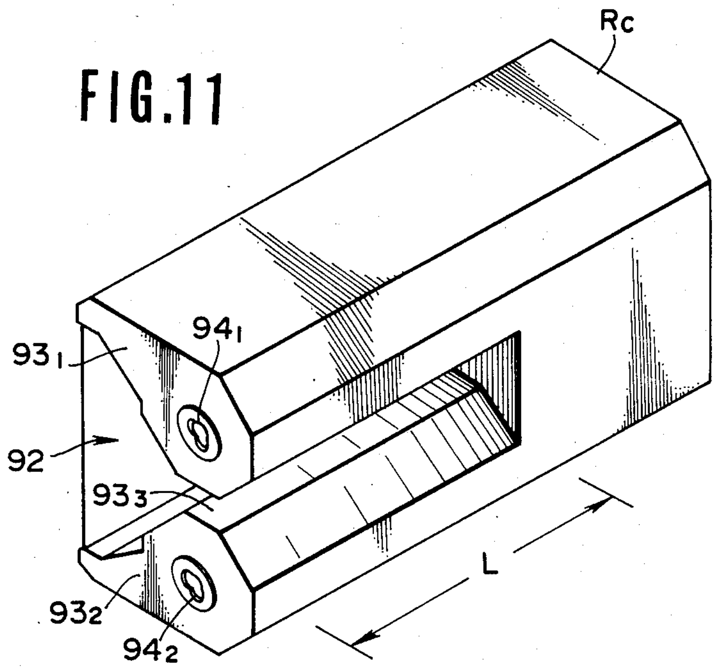
FIG. 11 is a perspective view showing the construction of the ribbon cassette.

The ribbon cassette Rc is removably mounted on the printer block 71. Move particularly, as shown in FIG. 11, the ribbon cassette Rc has a V shaped cross-section for defining a space 92 accommodating holder 72, guide member 73 and thermal head 51 between the rear surface of the exposed portion of the heat transfer ribbon 52 and the ribbon cassette Rc. Further, the ribbon cassette Rc is formed with a longitudinal slot $93_3$ fitting with a fitting member $71_1$ (see FIGS. 9 and 10) of the printer block 71, between the core housing members $93_1$ and $93_2$. The slot 93 and the fitting member $71_1$ have substantially the same length L which is selected to be longer than one half of the width of the heat transfer printing ribbon 52. As a consequence, when the ribbon cassette Rc is moved longitudinally with respect to the printer block 71, the ribbon cassette Rc can be mounted on and dismounted from the printer block 71. Recesses $94_1$ and $94_2$ adapted to engage cores 87 and 88 contained in the core receiving members $93_1$ and $93_2$ are formed on the side surfaces thereof so that when the ribbon cassette Rc is mounted on the printer block 71, the recesses $94_1$ and $94_2$ engage with projections $91_1$ and $91_2$ respectively. When the thermal head 51 is moved toward the platen 50 in a state in which the ribbon cassette Rc is mounted on the printer block 71, the heat transfer printing ribbon 52 would be urged against the platen 50 by member 73 as shown in FIG. 8. The copying paper P is clamped between the platen 50 and the thermal transfer printing ribbon 52 so as to heat fuse the inks of the ribbon 52 and transfer print the fused ink onto the copying paper as the thermal head generates heat corresponding to the picture image data.

Figure 12:
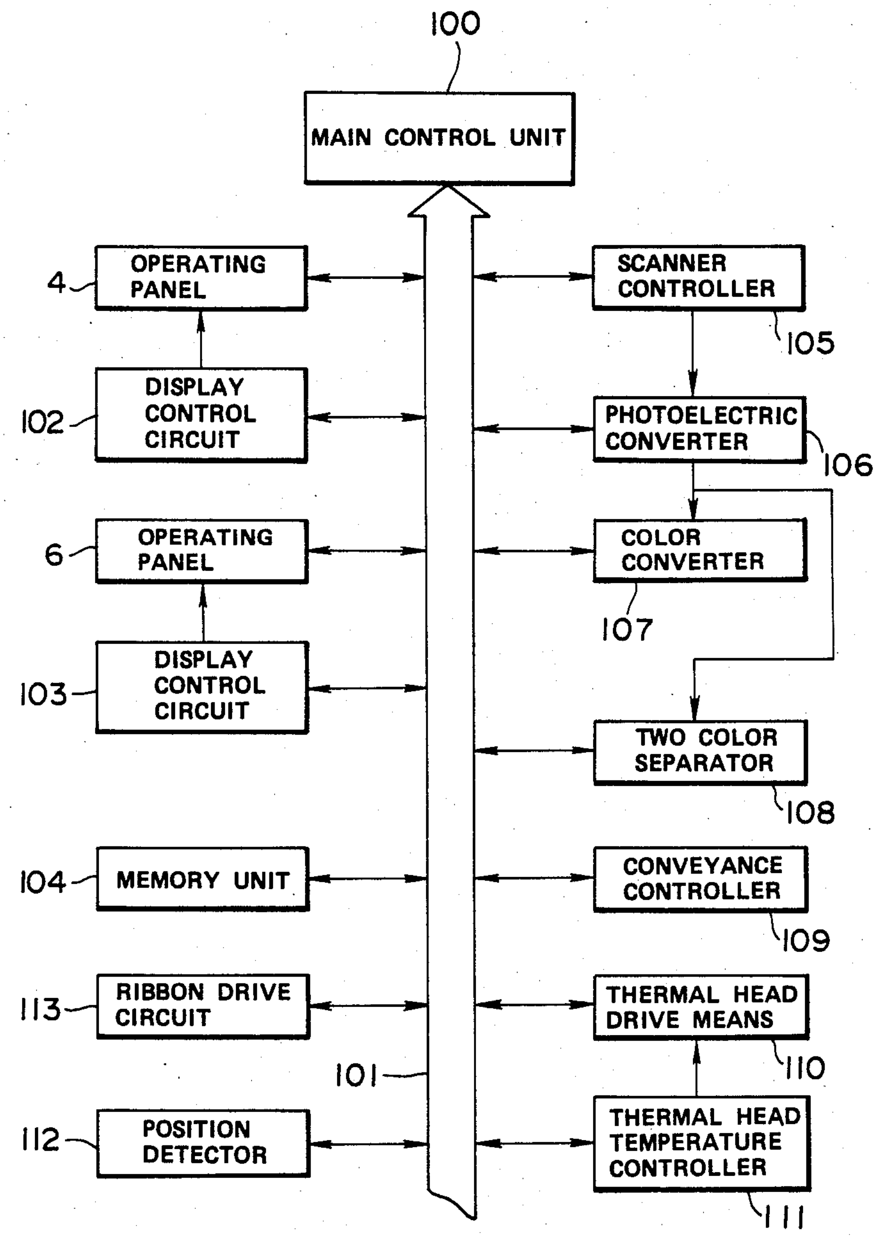
FIG. 12 is a block diagram showing a control system.

FIG. 12 is a block diagram diagrammatically showing the entire control system. The main control unit 100 is constituted by a central processing unit CPU and peripheral circuits associated therewith and a bus line 101 is connected to the main control unit 100. To the bus line 101 are connected the operating panel 4 of the picture image data read out apparatus 2, the operating panel 6 of the picture image forming unit 5, display control circuits 102 and 103 respectively controlling the operating panels 4 and 6, a memory unit 104, a scanner control unit 105, a photoelectric converter 104, a scanner controller 105, a photoelectric converter 106, a color converter 107, a two color separator 108, a carrier controller 109, a thermal head drive means 110, and a thermal head temperature controller 111. The display controllers 102 and 103 operate in response to signals sent from the main control unit 100 over the bus line 101 for controlling displayers 48 and 10 provided for the operating panels 4 and 6. Signals produced by operating keys on the operating panels 4 and 6 are sent to the main control unit 100 over the bus line 101 for effecting controls corresponding to these signals. The memory unit 104 operates in response to a signal sent from the main control unit 100 via the bus line 101 for storing data sent over the bus line 101 and for reading out stored data. In response to a signal sent from the main control unit 100 over the bus line 101, the scanner controller 105 operates to control the lamp 23 of the scanner 21, the pulse motor 28 and the photoelectric converter 106. In response to a signal sent from the main control unit 100 via the bus line 101, the photoelectric converter 106 detects the picture image on the manuscript to output a digitalized light color signal. The light converter 107 converts the light color signal outputted from the photoelectric converter 106 into color signals of respective inks of yellow, magenta, cyan and black, the converted color signals being outputted to the bus line 101. The two color separator 108 separates the light color signals outputted from the photoelectric converter 106 into black and red ink color signals, for example, as that the two color separator 108 is used where the manuscript picture image is constituted by two colors of black and red. The out signal from the two color separator 108 is applied to the bus line 101. The two color separator 108 and the color converter 107 also can subject signals from the bus line 101 to color conversion to send new signals to the bus line 101.

In response to a signal sent from the main control unit 100 over bus line 101, the conveyance controller 109 drives motors 89 and 90 driving the cores 87 and 88 of the cassette Rc, motor 89 for driving the platen 50, motors for driving paper feed rollers 53, resist roller 55, paper discharge roller 65 and solenoid coils driving first and second transfer gates 63 and 64. The thermal head driver 110 operates in response to a signal sent from the main control unit 100 over the bus line 101 and a signal from the thermal head temperature controller 111 for controlling the energization of the heat generating element of the thermal head which, in response to a signal sent from the main control unit 100 over the bus line 101, sends a temperature control signal to the thermal head driver 110.

The paper conveyance position detector 112 detects the conveyance position of the copying paper P (quantity of paper conveyed) by counting the number of pulses driving a motor (not shown), of the conveyance system. The heat transfer printing drive circuit 113 drives the heat transfer printing ribbon 52 with a timing matched with a position signal of the copying paper P supplied from the main control unit 100.

Figure 13:
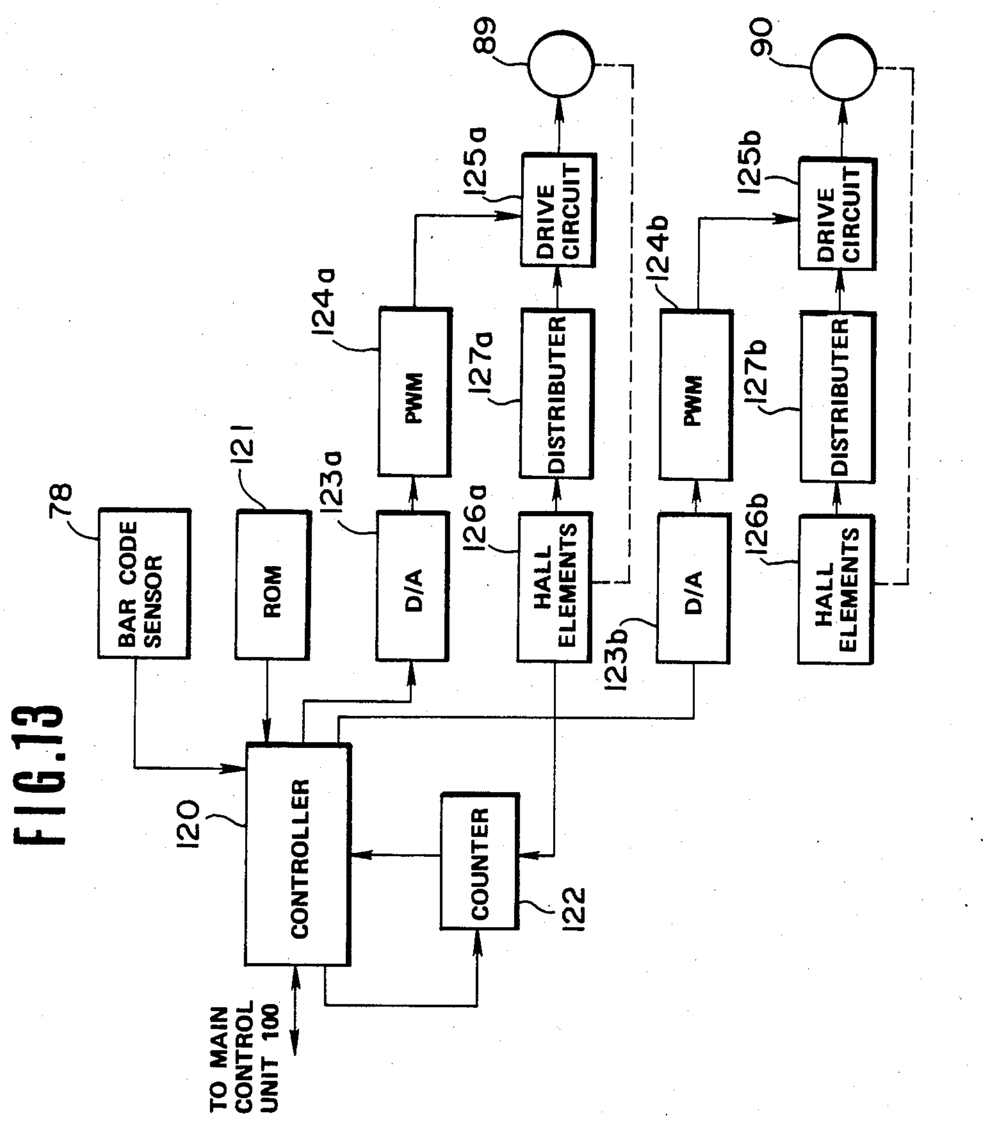
FIG. 13 is a block diagram showing a drive circuit of the ink donor sheet.

FIG. 13 illustrates the heat transfer printing ribbon drive circuit 113 comprising a controller 120 controlling the entire circuit, a read only memory (ROM) device 121 storing control data of ribbon motors 89 and 90, a counter 122 counting the number of revolutions of the ribbon motor 89 by counting the number of rotation detection signals from a group of Hall elements 126*a* to be described later, D/A converters 123*a* and 123*b* that convert control data read out from the ROM 121 into analog signals, pulse width modulators (PWM) 124*a* and 124*b* respectively outputting pulse signals of duty ratios corresponding to analog signals (voltages) respectively outputted from D/A converters 123*a* and 123*b*, Hall element groups 126*a* and 126*b* provided in the ribbon motors 87 and 88 respectively for outputting rotation detection signals (used as phase switching timing signals), distributors 127*a* and 127*b* respectively outputting phase switching signals in accordance with the rotation detection signals outputted from the Hall element groups 126*a* and 126*b*, drive circuits 125*a* and 125*b* which switch the currents flowing through windings of the ribbon motors 89 and 90 in response to the phase switching signals from the distributors 127*a* and 127*b* and determine values of the coil currents according to the on duties of the pulse signals of the pulse generators 124*a* and 124*b*, and a bar code sensor 78 for detecting the position of the ink ribbon 52.

The ROM 121 stores the count of the counter 122 and control data of the motors 89 and 90 corresponding to the output value of the code sensor 78. These control data are different depending upon at the time of conveyance of the paper before transfer printing, at the time of transfer printing, at the time of reverse running of the ribbon, at the time of stopping the ribbon, and at the time of running the ribbon without being urged against the platen, and these control data are set in accordance with the counts of the counter at respective operations, and the output of the bar code sensor 78. The control data are set to drive ribbon while conveying the paper before transfer printing at a larger torque 5 than other cases. While stopping, that is when the bar code sensor 78 detects a predetermined bar code, the control data are set to apply a large tension to the ribbon 52 in both the forward and reverse directions.

Figure 14A:
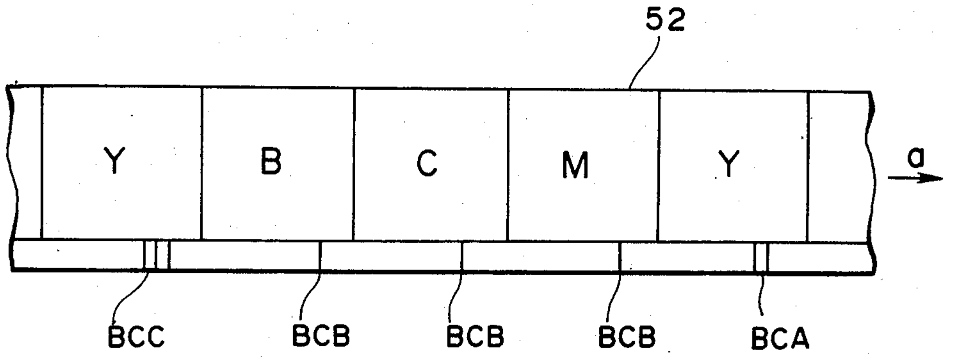
FIG. 14A is a plan view explaining bar code detection.
Figure 14B:
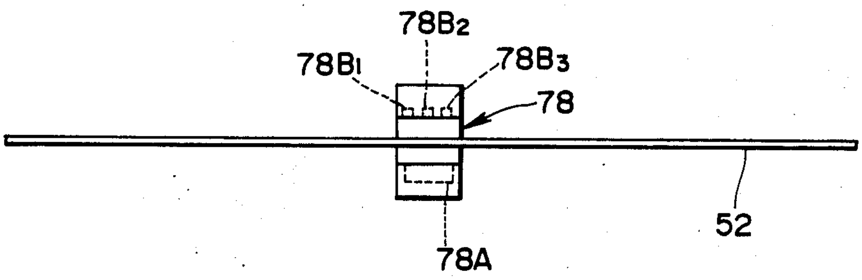
FIG. 14B is a side view of FIG. 14A.

The bar code and the bar code sensor for controlling the running and stopping of the heat transfer printing ribbon 52 are constructed as shown in FIGS. 14A and 14B. As shown in FIG. 14A, the heat transfer printing ribbon 52 is coated with color agents arranged in the order of yellow (Y), magenta (M), cyan (C) and black B in the direction of running so that the color agents are transfer printed in the order just mentioned. Since yellow (Y) is sufficient for the color detection, two bar codes BCA are printed near the region of yellow, whereas a single bar code BCB is printed near the regions of other color agents. Furthermore, three bar codes BCC are printed for detecting a point near the end of the heat transfer printing ribbon. These bar codes BCA, BCB and BCC are detected by a bar code sensor 78 in the form of a light interruptor shown in FIG. 14B. The bar code sensor 78 comprises a luminous element 78A, and three light receiving elements $78B_1$, $78B_2$ and $78B_3$ which are disposed on the opposite sides of the path of the ribbon 52, as shown in FIG. 8, the bar code detector 78 is mounted on an end edge of the bottom frame such that the heat transfer printing ribbon 52 can be inserted. The color of the yellow color agent and the position of the leading end of the yellow agent are detected by detecting the bar code BCA and at the time of transfer printing of other color agents, the positions of the leading ends of respective color agents of magenta, cyan and black are detected by detecting the bar code BCB.

The paper conveyance operation of the machine will now be described, with reference to FIGS. 13, 14 and 15A–15J. Upon closure of a source switch, not shown, the main control unit 100 supplies an initial setting signal to the controller 120 of the heat transfer printing ribbon drive circuit 113. Then, the controller 120 reads out from ROM 121 control data for initial setting, and supplies it to D/A converters 123*a* and 123*b* which convert the control data into analog signals supplied to the pulse width modulators 124*a* and 124*b* which supply to drive circuits 125*a* and 125*b* pulse signals having duty ratios corresponding to the analog signals. Then, drive circuits 125*a* and 125*b* respectively drive ribbon motors 89 and 90 with torques determined by the on duty of the pulse signals. Consequently, the ribbon 52 would be run in the forward direction (shown by arrow a) under a certain tension. During the running, when the bar code sensor 78 detects the bar code on the ribbon 52, the controller 120 stops running of the ribbon motors 89 and 90 and initializes the counter 122.

Under this state, as the print key 41 is inserted, main controller 100 supplies a take out signal to the conveyance controller 109 which controls the paper feed roller 53 so as to take out the copying paper P. Upon commencement of the take out of the paper, the paper conveyance position detector 112 counts the member of pulses supplied to the motor, not shown, for driving the conveyance controller 109 whereby the conveyance position of the paper P is determined by the count.

Figure 15A:
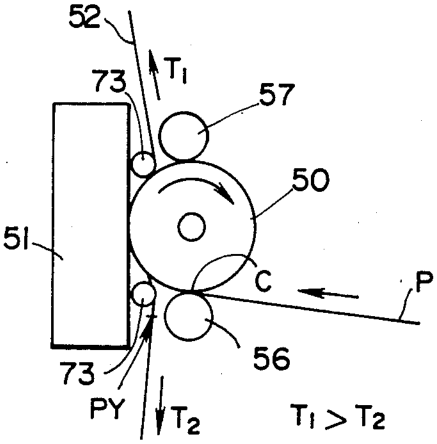
FIGS. 15A through 15J are side views for explaining the running and stopping operations of the ink donor sheet.
Figure 15B:
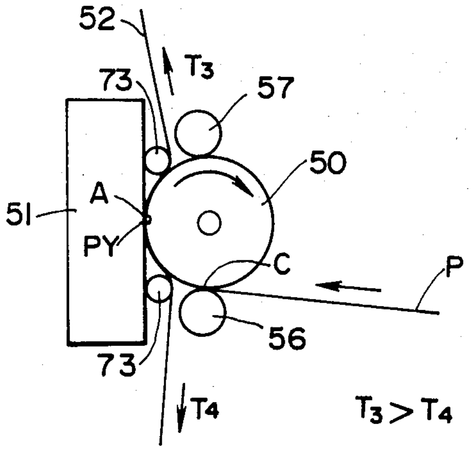
Figure 15C:
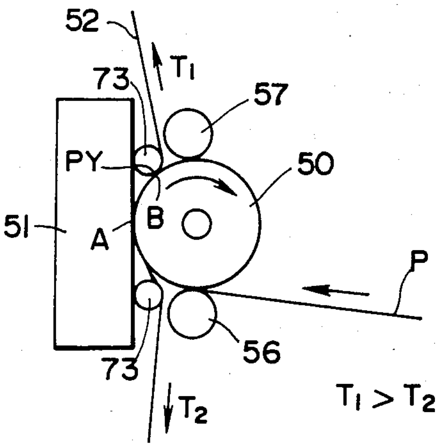
Figure 15D:
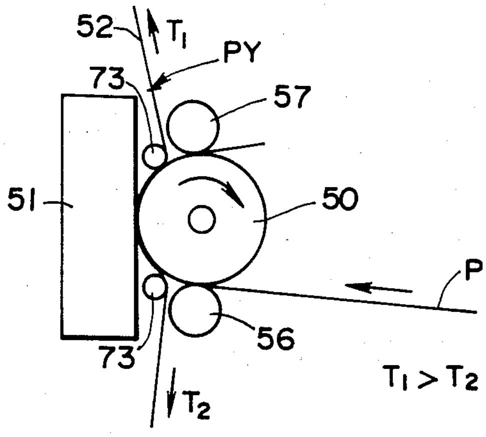
Figure 15:
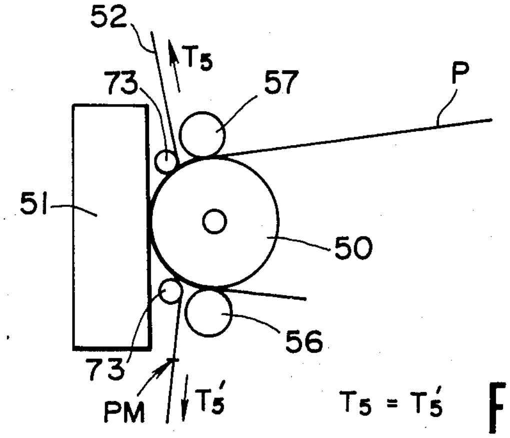
Figure 15:
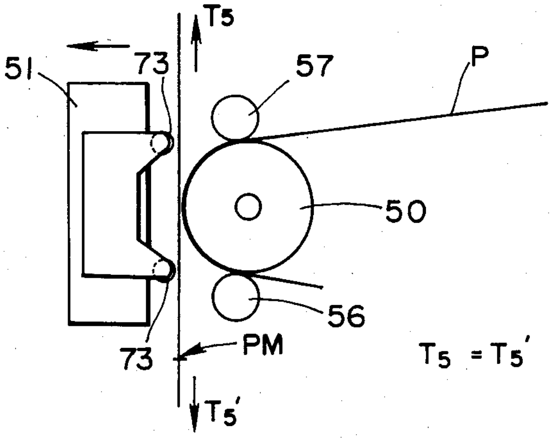
Figure 15:
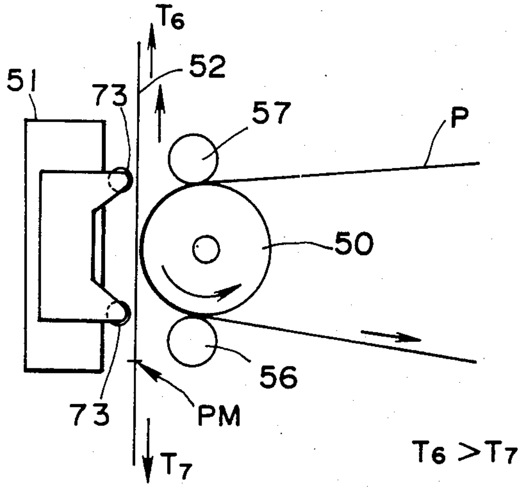

As the paper conveyance position detector 112 detects the arrival of the leading end of the paper at a point C at which the member 73 and the platen 50 oppose with each other, the main controller 100 again issues a drive signal to the controller 120 of the heat transfer printing ribbon drive circuit 113. Then the controller 120 reads out from ROM 121 a control signal corresponding to the paper conveyance before transfer printing, that is a control signal producing a normal torque, and supplies the read out control signal to D/A converters 123*a* and 123*b* whereby the drive circuits 125*a* and 125*b* respectively rotate the ribbon motors 89 and 90 with torque determined by the on duty of the pulse signal. As a consequence, the ribbon 52 is run in the forward direction under the normal tension. At this time, the thermal head 51 is moved by the head moving mechanism to urge the copying paper P against the platen 50 through ribbon 52. Thus as shown in FIG. 15A, the thermal head 51 contacts to platen 50 with the ribbon 52 interposed therebetween while the platen 50 is rotating in the direction of an arrow and the ribbon is pulled in the opposite directions by the torques of motors 42 under tensions $T_1$ and $T_2$. The tensions are maintained in a relation $T_1 > T_2$ by controlling motors 42 so that the ribbon 15 is run in synchronism with the rotation of the platen 10 so that the copying paper P may be conveyed while being clamped between the ribbon 52 and the platen 50. Furthermore, in response to a signal from the Hall element group 126*a*, the counter 122 begins its counting operation. A symbol PY shows the position of the leading end of the ribbon coated with a yellow color agent to be firstly transfer printed.

Then, when the controller 120 detects that the leading end of the copying paper P has reached (see FIG. 15B) point A (transfer printing point) at which the thermal head 51 and the platen 50 come to oppose with each other, based on the count of the counter 122 a control signal corresponding to the conveyance of the paper P succeeding point A, that is a signal producing a torque larger than normal is read out from ROM 121 and the read out signal is supplied to D/A converters 123*a* and 123*b*. Accordingly, the drive circuits 125*a* and 125*b* respectively drive ribbon motors 89 and 90 with torques determined by the on duty of the pulse signal. Consequently the ribbon 52 will be run in the forward direction under a tension larger than normal, thereby conveying the paper P while being clamped between the ribbon 52 and the platen 50. The initial position of ribbon 52, that is the printing starting position confronts point A. Furthermore, in response to a signal from the thermal head temperature controller 111, the head generating element of the thermal head 51 is energized for heat transfer printing informations corresponding to respective scanning lines on the copying paper P utilizing the thermal head.

When the controller 120 detects that the leading end of the paper P has arrived at point B between the member 73 and the platen 50 based on the count of the counter 122 (see FIG. 15C), a control signal corresponding to the paper conveyance at the time of transfer printing, that is a signal producing a normal torque is read out from ROM 121 and the read out signal is supplied to D/A converters 123*a* and 123*b*. Accordingly, the drive circuits 125*a* and 125*b* rotate ribbon motors 87 and 88 with torques determined by the on duty of the pulse signal. Consequently, the ribbon 52 is run in the forward direction under the normal tension (See FIG. 5D).

Consequently, while the paper P is being conveyed from point A to point B a large torque, that is tension is applied to the ribbon 52 so that where a thick paper or stiff paper is used, its leading end would not be entrapped whereby the paper can be positively conveyed between the platen 50 and the member 73.

When the transfer printing of the first color agent of yellow onto a predetermined portion of the copying paper P has completed as shown in FIG. 15E, the tension of the heat transfer printing ribbon 52 is adjusted to be $T_5=T_5'$, whereby the heat transfer ribbon 52 is stopped running. Accordingly, the thermal held 51 is separated away from the platen 50 as shown in FIG. 15F in which PM shows the position of the leading end of the color agent of magenta to be transfer printed next time.

Then as shown in FIG. 15G, the platen 50 is rotated in the opposite direction to return the copying paper P to the transfer printing starting position for transfer printing a color agent of magenta and for the purpose of bringing the leading end of the magenta color agent to effect heat transfer printing thereof, a forward tension $T_6$ is applied to the force end of the heat transfer printing ribbon by motors 87 and 88 while a rearward tension $T_7$ ($T_6>T_7$) is applied to commence to run the ribbon in the forward direction.

Figure 15H:
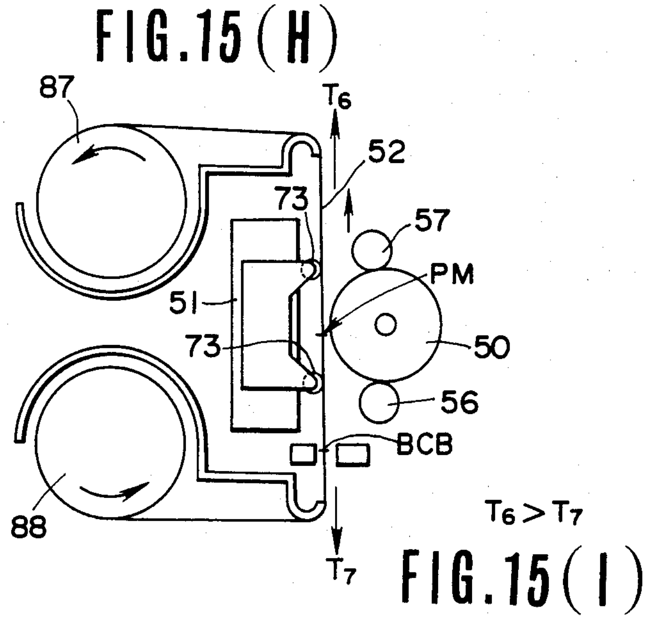
Figure 15I:
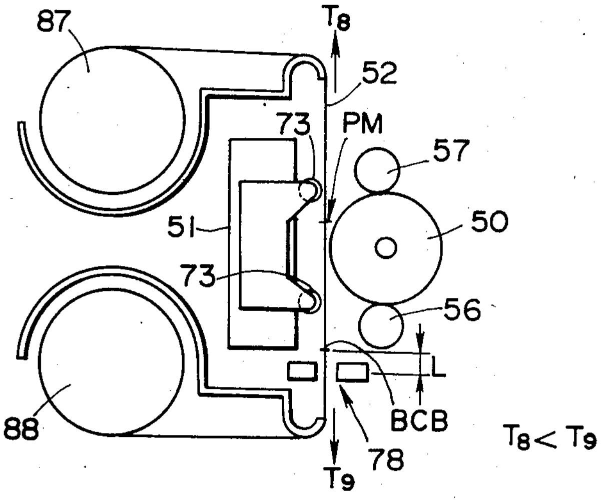

As shown in FIG. 15H, while conveying the heat transfer printing ribbon 52 under tensions $T_6$ and $T_7$, when the bar code sensor 78 detects the bar code BCB, the controller 120 controls the torques of drive motors 87 and 88 via D/A converters 123*a* and 123*b* and pulse width modulators 124*a* and 124*b* so as to apply tension $T_8$ to the heat transfer printing ribbon 52 in a direction toward the take up core 87 and to apply a tension $T_9$ ($T_8>T_9$) in a direction toward the take up core 88. As a consequence, a braking force is applied to the ribbon 52 which has been run from the core 88 to the core 87 whereby the ribbon is stopped as shown in FIG. 15(I) after over running a distance L smaller than that of the prior art. The values of tensions $T_8$ and $T_9$ are selected such that even when $T_8<T_9$, the stopped ribbon would not be moved in the direction of tension $T_9$. For this reason, the values of the tensions $T_8$ and $T_9$ should be determined by taking into consideration such factors as the friction between the ribbon 52 and the ribbon guide 73 and the guide members or the like.

Figure 15J:
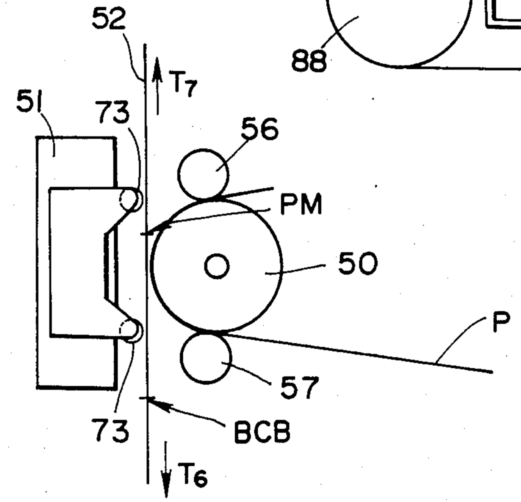

Consequently, the copying paper P is returned to the transfer printing starting position as shown in FIG. 15J, and when the leading end PM of the magenta color agent of the ribbon 52 is conveyed to a predetermined forward position, the heat sensitive head 51 is again pushed toward the platen 50. In this manner, the operations shown in FIG. 15B through 15J are repeated to transfer print remaining color agents in the same manner.

In the embodiment described above, after completing the transfer printing operation of one color agent, and when the heat transfer printing ribbon is run forwardly to bring the start position of a color agent to be transfer printed in the next transfer printing operation to a predetermined position, the ribbon 52 is stopped by applying a braking force created by making the tension $T_9$ applied by the core 88 on the rear side of the ribbon to be larger than the tension $T_8$ applied by the core connected to the leading end of the ribbon, thereby decreasing the amount of our running of the ribbon 52. Consequently not only the waste of the transfer printing ribbon can be reduced but also accurate superposed transfer printing operations of respective colors can be assured. During stopping, since drive motors 87 and 88 apply opposite tensions to the heat transfer printing ribbon 52, the ribbon would not slack.

It should be understood that the invention is not limited to the specific embodiment described above, and that various changes and modifications will be obvious to one skilled in the art. For example, the relation between tensions $T_8$ and $T_9$ applied for braking and stopping the ribbon 52 after detecting the bar code BCB is not limited to that shown in the embodiment. For example, for temporarily stopping the ribbon 52, values of the tensions $T_8$ and $T_9$ are selected such that the ribbon will move in the opposite direction, that is in the direction of tension $T_9$, and these tensions are applied only a short time for applying a quick braking force. Thereafter, the tensions are made substantially equal but opposite to maintain the ribbon in a stopped state under a slight tension. It is only necessary to properly control the speeds, and torques of the drive motors for respective cores for applying a braking force to the transfer printing ribbon at the time of stopping the same thus preventing the over running.

Figure 16:
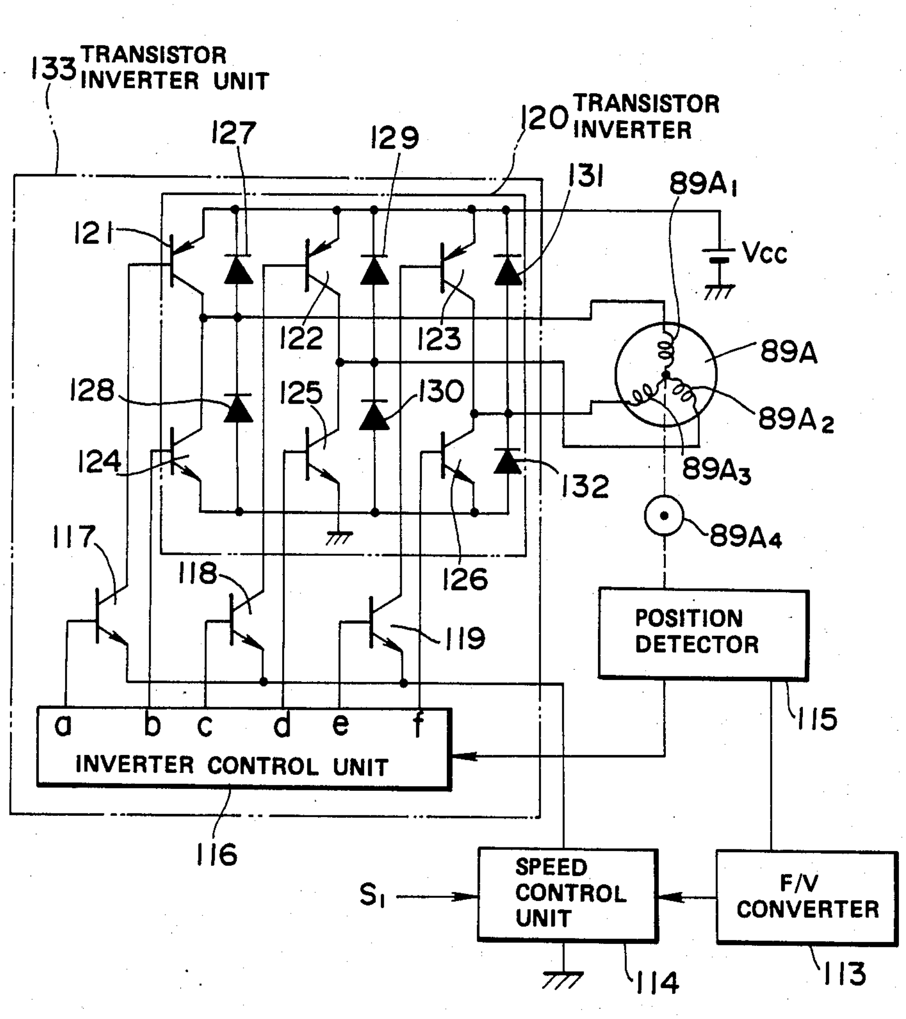
FIG. 16 is a block diagram showing a motor drive circuit.

The motor drive circuit can be constructed as shown in FIG. 16 which is used for driving motor 89. Of course, similar circuit is also provided for drive motor 90. The motor 89 is constructed as a brushless motor, for example, and by sequentially energizing its stator windings $89A_1$, $89A_2$ and $89A_3$ the motor is rotated.

The position of the rotor $89A_4$ of the motor 89 is detected in accordance with the output of a position detector 115, that is the states of a plurality of Hall elements installed in the motor 89. The output of the position detector 115 is sent to an inverter control unit 116 and a frequency-voltage converter 113. However, the output sent to the frequency-voltage converter 113 may be the output of only one Hall element.

The position detection signal sent to the frequency-voltage converter 113 will be described first. As above described, the signal sent to the frequency-voltage-converter 113 is the output of only one Hall element, which is a pulse signal corresponding to the number of revolutions of the drive motor 89. The frequency-voltage converter 113 produces a voltage signal corresponding to the frequency of the signal supplied thereto. The output of the frequency-voltage converter 113 is supplied to a speed control unit 114 which compares the voltage signal with a reference voltage corresponding to a speed set signal $S_1$ supplied by the conveyance control unit 47 to output a pulse shaped switching signal which renders the voltage signal to coincide with the reference signal. For example, when the speed of the motor is low, a switching signal having a long ON width is outputted, whereas when the motor speed is high, a switching signal having a short ON width is outputted.

The position detection signal sent to the inverter control unit 116 will now be described. The inverter control unit 116 outputs excitation phase switching signals from its output terminals a–f in accordance with the detection signal from the position detector 115. The outputs from the output terminals a, c and e of the inverter control unit 116 are applied to the base electrodes of NPN type transistors 117, 118 and 119 respectively acting as switching elements, and the emitter electrodes of these transistors are supplied with a switching signal from the speed control unit 114. These transistors 117, 118 and 119 switch the internals of applying the exciting voltages to the stator windings 89$A_1$, 89$A_2$ and 89$A_3$ so as to transfer the excitation phase switching signals from the inverter control unit 116 in accordance with the switching signal.

The exciting phase switching signals outputted from the output terminals b, d and f of the inverter control unit 116 and the output signals from the collector electrodes of transistors 117, 118 and 119 are supplied to a transistor inverter 120 which is constituted by PNP type transistors 121, 122 and 123, NPN type transistors 124, 125 and 126, and diodes 127, 128, 129, 130, 131 and 132 so as to turn ON or OFF transistor in accordance with the signals supplied thereto for applying exciting voltages to the stator windings 89$A_1$, 89$A_2$ and 89$A_3$, the inverter control unit 116 and the transistor inverter 120 constitute a transistor inverter unit 133. When the output terminals a and d of the inverter control unit 116 produce excitation phase switching signals at a high level, for example, transistor 117 is ON-OFF controlled by the switching signal from the speed control unit 114, while transistor 125 is turned ON. Consequently, as the transistor 121 is turned ON, current from a source Vcc flows through a circuit including transistor 121, stator windings 89$A_1$ and 89$A_2$, and transistor 125. When transistor 121 is OFF, the current is switched to flow a circuit including diode 128, stator windings 89$A_1$ and 89$A_2$, and transistor 125 while maintaining the supply of the current to stator windings 89$A_1$ and 89$A_2$. Consequently, the effective value of the voltage applied to the motor 89 is changed in accordance with the ON-OFF widths (duly ratio) of the switching signal from the speed control unit 114 to vary the torque of the motor 89. In other words, when the ON width of the switching signal is long, the effective value of the voltage applied to the motor becomes large, thus increasing the torque. On the other hand, when the ON width is short, the effective value of the current flowing in the motor decreases, thus decreasing the motor torque.

When excitation phase switching signals are outputted from the other output terminals of the inverter control unit 116 similar operations are made. Both drive motors 89 and 90 are independently controlled by the motor drive circuit to produce desired torques so as to change the tension applied to the heat transfer printing ribbon 52, thus causing the same to run and stop.

While in the foregoing embodiment, the tension of the ribbon was made high while the leading end of the copying paper P is being conveyed from point A to point B, the tension can be increased when a paper other than fixing paper is conveyed or when the copying paper P is conveyed from point C to point B. Further, the tension of the ribbon can be increased while the trailing end of the copying paper P is conveyed from point A to point C. Further, although the value of the current supplied to the motor from the drive circuit was varied by varying the duty cycle, the same object can be accomplished by varying the applied voltage.

The heat transfer printing ribbon can be driven by controlling the motor torque in accordance with the diameter of the coil of the ribbon as disclosed in Japanese Patent Application No. 129351/1984.

What is claimed is:

1. A picture image forming apparatus for transferring ink from an ink donor sheet onto a copying medium having a leading end, said apparatus comprising:

a platen roller having a peripheral surface portion;

a first core for taking up one end of said ink donor sheet;

a second core for taking up the other end of said ink donor sheet;

means for guiding said ink donor sheet along said peripheral surface portion of said platen roller;

means for conveying said copying medium to place the leading end of said copying medium between said ink donor sheet and said peripheral surface portion of said platen roller, and for conveying said copying medium along said peripheral surface portion of said platen roller while said copying medium is superposed on said ink donor sheet;

a recording head disposed in opposition to said platen roller, for transferring ink from said ink donor sheet onto said copying medium while said superposed ink donor sheet and copying medium are conveyed along said peripheral surface of said platen roller; and ink donor sheet control means having first and second drive means for applying first and second torques different in value and opposite in direction to said first core and said second core respectively to subject said ink donor sheet to a first tension, said ink donor sheet control means including means for increasing the difference in value between said first and second torques to subject said ink donor sheet to a second tension greater than said first tension at times when the leading end of said copying medium is at a selected location near said recording head to prevent separation of the leading end of said copying medium from said peripheral surface of said platen roller.

2. The picture image forming apparatus according to claim 1, wherein each of said first and second drive means comprises a brushless motor having stator windings, and said ink donor sheet control means includes means for applying a pulsed electric current to said respective stator windings of said brushless motors to control individually said first and second torques created by said first and second drive means.

3. The picture image forming apparatus according to claim 2, wherein said ink donor sheet control means further includes means for controlling the duty ratio of said pulsed electric current applied to said respective stator windings of said brushless motors.

4. The picture image forming apparatus according to claim 1, further comprising guide means spaced apart from said recording head in a conveying direction of said copying medium for guiding said copying medium, and wherein said selected location is between said recording head and said guide means.

5. The picture image forming apparatus according to claim 1, further comprising first and second guide means respectively located on opposite sides of said recording head with respect to the conveying direction of said copying medium for guiding said copying medium, and wherein said selected location is between said second guide means and said first guide means.

6. A picture image forming apparatus for transferring ink from an ink donor sheet onto a copying medium having a leading end, said apparatus comprising:

a platen roller having a peripheral surface portion;

a first core for taking up one end of said ink donor sheet;

a second core for taking up the other end of said ink donor sheet;

means for guiding said ink donor sheet along said peripheral surface of said platen roller;

means for conveying said copying medium to place the leading end of said copying medium between said ink donor sheet and said peripheral surface portion of said platen roller, and for conveying said copying medium along said peripheral surface portion of said platen roller while said copying medium is superposed on said ink donor sheet;

a recording head disposed in opposition to said platen roller, for transferring ink from said ink donor sheet onto said copying medium while said superposed ink donor sheet and copying medium are conveyed along said peripheral surface portion of said platen roller;

first drive means for supplying a first torque to said first core;

second drive means for supplying a second torque to said second core;

means for detecting a conveyance position of said ink donor sheet;

memory means for storing control data corresponding to the conveyance position of said ink donor sheet, said control data controlling said first and second drive means such that said first and second torques are supplied at different values in opposite directions to subjecct said ink donor sheet to a first tension and, at times when the leading end of said copying medium is at a selected location near said recording head, the difference in value between said first and second torques is increased to subject said ink donor sheet to a second tension greater than said first tension; and control means for reading out said control data from said memory means in accordance with an output of said conveyance position detecting means and for supplying read out of said control data to said first and second drive means to control said first and second drive means.

7. The picture image forming apparatus according to claim 6, wherein each of said first and second drive means comprises a brushless motor having stator windings, and said control means includes means for applying a pulsed electric current to said respective stator windings of said brushless motors in accordance with said control data to control individually said first and second torques created by said first and second drive means.

8. The picture image forming apparatus according to claim 7, wherein said control means further includes means for controlling the duty ratio of said pulsed electric current applied to said respective stator windings of said brushless motors in accordance with said control data.

9. The picture image forming apparatus according to claim 7, wherein said conveyance position detecting means comprises at least one Hall element disposed on one of said first and second cores and producing pulse signals corresponding to the rotational position of said one core, and a counter for counting the number of said pulse signals generated by said Hall element.

10. The picture image forming apparatus according to claim 7, wherein said conveyance position detecting means comprises at least one Hall element disposed on one of said motors and generating pulse signals corresponding to the rotational position of said one motor, and a counter for counting the number of said pulse signals generated by said Hall element.

11. A picture image forming apparatus for transferring ink from an ink donor sheet onto a copying medium having a leading end, said apparatus comprising:

a platen roller having a peripheral surface portion;

a first core for taking up one end of said ink donor sheet;

a second core for taking up the other end of said ink donor sheet;

means for guiding said ink donor sheet along said peripheral surface portion of said platen roller;

means for conveying said copying medium to place the leading end of said copying medium between said ink donor sheet and said peripheral surface of said platen roller, and for conveying said copying medium along said peripheral surface portion of said platen roller while said copying medium is superposed on said ink donor sheet;

a recording head disposed in opposition to said platen roller, for transferring ink from said ink donor sheet onto said copying medium while said superposed ink donor sheet and copying medium are conveyed along said peripheral surface of said platen roller; and ink donor sheet control means for controlling conveyance of said ink donor sheet between said first and second cores, said ink donor sheet control means including first drive means for applying a first torque to said first core and second drive means for applying a second torque to said second core, said first and second torques being applied in opposite directions, said first torque being larger than said second torque when said ink donor sheet is being conveyed from said second core to said first core, said second torque being made larger than said first torque and then said first torque being made equal to said second torque when said ink donor sheet is to be stopped.

12. The picture image forming apparatus according to claim 11, wherein each of said first and second drive means comprises a brushless motor having stator windings, and said ink donor sheet control means includes means for applying a pulsed electric current to said respective stator windings of said brushless motors to control individually said first and second torques created by said first and second drive means.

13. The picture image forming apparatus according to claim 12, wherein said ink donor sheet control means further includes means for controlling the duty ratio of said pulsed electric current applied to said respective stator windings of said brushless motors.

14. A picture image forming apparatus for transferring ink from an ink donor sheet onto a copying medium having a leading end, said apparatus comprising:

a platen roller having a peripheral surface portion;

a first core for taking up one end of said ink donor sheet;

a second core for taking up the other end of said ink donor sheet;

means for guiding said ink donor sheet along said peripheral surface of said platen roller;

means for conveying said copying medium to place the leading end of said copying medium between said ink donor sheet and said peripheral surface of said platen roller, and for conveying said copying medium along said peripheral surface of said platen roller while said copying medium is superposed on said ink donor sheet;

a recording head disposed in opposition to said platen roller, for transferring ink from said ink donor sheet onto said copying medium while said superposed ink donor sheet and copying medium are conveyed along said peripheral surface of said platen roller;

first drive means for applying a first torque to said first core;

second drive means for applying a second torque to said second core;

means for detecting a conveyance position of said ink donor sheet;

memory means for storing control data corresponding to the conveyance position of said ink donor sheet, said control data controlling said first and second drive means such that said first and second torques are supplied in opposite directions, said first torque being larger than said second torque when said ink donor sheet is being conveyed from said second core to said first core, said second torque being made larger than said first torque and then said first torque being made equal to said second torque when said ink donor sheet is to be stopped; and control means for reading out said control data from said memory means in accordance with an output of said conveyance position detecting means and for supplying read out of said control data to said first and second drive means to control said first and second drive means.

15. The picture image forming apparatus according to claim 14, wherein each of said first and second drive means comprises a brushless motor having stator windings, and said control means includes means for applying a pulsed electric current to said respective stator windings of said brushless motors to control individually said first and second torques created by said first and second drive means.

16. The picture image forming apparatus according to claim 15, wherein said control means further includes means for controlling the duty ratio of said pulsed electric current applied to said respective stator windings of said brushless motors in accordance with said control data.

17. The picture image forming apparatus according to claim 14, wherein said ink donor sheet includes a bar code at a predetermined position, and said conveyance position detecting means comprises a bar code sensor which optically reads said bar code.

18. A picture image forming apparatus for transferring ink from an ink donor sheet onto a copying medium having a leading end, said apparatus comprising:

a platen roller having a peripheral surface portion;

a first core for taking up one end of said ink donor sheet;

a second core for taking up the other end of said ink donor sheet;

means for guiding said ink donor sheet along said peripheral surface of said platen roller;

means for conveying said copying medium to place the leading end of said copying medium between said ink donor sheet and said peripheral surface of said platen roller, and for conveying said copying medium along said peripheral surface of said platen roller while said copying medium is superposed on said ink donor sheet;

a recording head disposed in opposition to said platen roller, for transferring ink from said ink donor sheet onto said copying medium while said superposed ink donor sheet and copying medium are conveyed along said peripheral surface of said platen roller;

first drive means for applying a first torque to said first core;

second drive means for applying a second torque to said second core; and control means for controlling said first and second drive means such that when said ink donor sheet is conveyed from said second core to said first core, said first and second torques are applied in opposite directions and said first torque is larger than said second torque; when said ink donor sheet is conveyed from said first core to said second core, said first and second torques are applied in opposite directions and said second torque is larger than said first torque; and when said ink donor sheet is to be stopped, said first and second torques are applied in opposite directions and said first and second torques are equal.

19. The picture image forming apparatus according to claim 18, wherein each of said first and second drive means comprises a brushless motor having stator windings, and said control means includes means for applying a pulsed electric current to said respective stator windings of said brushless motors to control individually said first and second torques created by said first and second drive means.

20. The picture image forming apparatus according to claim 19 wherein said control means further includes means for controlling the duty ratio of said pulsed electric current applied to said respective stator windings of said brushless motors.

* * * * *